US010253745B2

(12) United States Patent
Duan et al.

(10) Patent No.: US 10,253,745 B2
(45) Date of Patent: Apr. 9, 2019

(54) METHODS AND APPARATUSES FOR COMBUSTION DIAGNOSIS AND CONTROL OF INTERNAL COMBUSTION ENGINES USING ACCELEROMETERS

(71) Applicant: Cummins Inc., Columbus, IN (US)

(72) Inventors: Jie Duan, Columbus, IN (US); Richard A. Booth, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 105 days.

(21) Appl. No.: 15/383,866

(22) Filed: Dec. 19, 2016

(65) Prior Publication Data

US 2017/0211538 A1 Jul. 27, 2017

(30) Foreign Application Priority Data

Dec. 23, 2015 (GB) .................................. 1522754.9

(51) Int. Cl.
*F02D 35/00* (2006.01)
*F02P 5/152* (2006.01)
*F02P 5/15* (2006.01)
*F02D 35/02* (2006.01)
*F02D 41/14* (2006.01)

(52) U.S. Cl.
CPC ............ *F02P 5/152* (2013.01); *F02D 35/023* (2013.01); *F02D 35/027* (2013.01); *F02D 41/1498* (2013.01); *F02P 5/15* (2013.01)

(58) Field of Classification Search
USPC ................................... 123/435; 701/111–114
See application file for complete search history.

(56) References Cited

U.S. PATENT DOCUMENTS

| 6,388,444 | B1 | 5/2002 | Hahn et al. |
| 6,408,819 | B1 * | 6/2002 | Mezger ................. F02D 35/024 123/406.29 |
| 8,078,389 | B2 | 12/2011 | Huang et al. |
| 8,108,131 | B2 | 1/2012 | Huang et al. |

(Continued)

FOREIGN PATENT DOCUMENTS

| FR | 2513318 | 3/1983 |
| GB | 2 069 601 | 8/1981 |
| GB | 2 105 408 | 3/1983 |

OTHER PUBLICATIONS

Search Report for UK Patent Application No. GB 1522754.9, dated Jun. 28, 2016, 3 Pages.

*Primary Examiner* — Thomas Moulis
(74) *Attorney, Agent, or Firm* — Foley & Lardner LLP

(57) ABSTRACT

Methods and systems for diagnosis and control of an internal combustion engine using vibration data obtained from a vibration sensor mounted on the engine includes filtering vibration data within a predetermined engine combustion time period, where the vibration data is indicative of a vibration of an internal combustion engine, determining a peak cylinder pressure (PCP) of a combustion cycle of the internal combustion engine based on the filtered vibration data, determining a location of peak cylinder pressure (LPP) of the combustion cycle of the internal combustion engine based on the filtered vibration data, where the PCP and the LPP are indicative of a performance characteristic of the combustion cycle, and modifying an ignition timing of the internal combustion engine based on the determined PCP and LPP.

24 Claims, 8 Drawing Sheets

(56) References Cited

U.S. PATENT DOCUMENTS

| | | | |
|---|---|---|---|
| 9,903,307 B2* | 2/2018 | Polonowski | F02D 41/403 |
| 2006/0106523 A1* | 5/2006 | Ancimer | G01L 23/225 |
| | | | 701/111 |
| 2006/0169243 A1* | 8/2006 | Neunteufl | F02B 1/00 |
| | | | 123/295 |
| 2007/0089697 A1* | 4/2007 | Hara | F02D 35/023 |
| | | | 123/90.15 |
| 2008/0051975 A1* | 2/2008 | Ker | F02D 35/02 |
| | | | 701/102 |
| 2008/0053405 A1* | 3/2008 | Vigild | F02D 35/027 |
| | | | 123/406.26 |
| 2008/0264382 A1* | 10/2008 | Kang | F02D 35/023 |
| | | | 123/435 |
| 2010/0162803 A1 | 7/2010 | Scafati et al. | |
| 2010/0224168 A1* | 9/2010 | Yasuhara | F02D 35/028 |
| | | | 123/406.23 |
| 2010/0313640 A1 | 12/2010 | Galtier et al. | |
| 2011/0083642 A1* | 4/2011 | Landsmann | F02D 35/023 |
| | | | 123/435 |
| 2011/0168129 A1* | 7/2011 | Kurtz | F02D 19/061 |
| | | | 123/294 |
| 2011/0288742 A1* | 11/2011 | Wermuth | F02D 35/02 |
| | | | 701/102 |
| 2012/0150414 A1* | 6/2012 | Huang | F02D 35/024 |
| | | | 701/101 |
| 2013/0080026 A1* | 3/2013 | Kang | F02D 13/0207 |
| | | | 701/102 |
| 2013/0184967 A1* | 7/2013 | Kang | F02D 41/14 |
| | | | 701/102 |
| 2013/0298869 A1* | 11/2013 | Hirzinger | F02D 35/023 |
| | | | 123/395 |
| 2016/0160776 A1* | 6/2016 | Yeager | F02D 35/023 |
| | | | 123/435 |
| 2016/0160779 A1* | 6/2016 | Yeager | F02D 41/009 |
| | | | 701/103 |
| 2016/0169132 A1* | 6/2016 | Yeager | F02D 41/0027 |
| | | | 701/103 |
| 2016/0169133 A1* | 6/2016 | Yeager | F02D 41/0027 |
| | | | 123/435 |
| 2018/0112622 A1* | 4/2018 | Atterberry | F02D 43/00 |

* cited by examiner

METHODS AND APPARATUSES FOR COMBUSTION DIAGNOSIS AND CONTROL OF INTERNAL COMBUSTION ENGINES USING ACCELEROMETERS

CROSS-REFERENCE TO RELATED APPLICATIONS

This application claims priority to United Kingdom Patent Application No. 1522754.9, filed on Dec. 23, 2015, the contents of which are incorporated herein by reference in their entirety and for all purposes.

BACKGROUND

The present disclosure relates to diagnosis and control of internal combustion engines. More particularly, the present disclosure relates to diagnosis and control of internal combustion engines using signals from accelerometers mounted on the engines.

Emissions regulations for internal combustion engines have become increasingly stringent over recent years. Consumer and regulators increasingly demand that fuel efficiency of vehicles improve and at the same time fewer pollutants are emitted. In operating an internal combustion engine, combustion data may provide important information for diagnosing and controlling an operation parameter of the engine to improve engine performance and reduce toxic exhaust gas emissions. However, conventional in-cylinder pressure sensors used to collect data indicative of the combustion characteristics are expensive to install in combustion chambers. Moreover, pressure sensors installed in the cylinders may be damaged by the high temperatures and pressures associated with typical engine use. Therefore, a low-cost technique with durability for diagnosis and control of engines is desired.

SUMMARY

One embodiment relates to an apparatus. The apparatus includes a filter circuit structured to filter vibration data within a predetermined engine combustion time period. The vibration data is indicative of a vibration of an internal combustion engine. The apparatus also includes a peak cylinder pressure (PCP) determination circuit operatively and communicably coupled to the filter circuit and structured to determine a PCP of a combustion cycle of the internal combustion engine based on the filtered vibration data, and a location of peak cylinder pressure (LPP) determination circuit operatively and communicably coupled to the filter circuit and structured to determine a LPP of the combustion cycle of the internal combustion engine based on the filtered vibration data. The PCP and the LPP are indicative of a performance characteristic of the combustion cycle. The apparatus further includes an ignition timing circuit operatively and communicably coupled to the PCP determination circuit and the LPP determination circuit. The ignition timing circuit is structured to modify an ignition timing of the internal combustion engine based on the determined PCP and LPP.

Another embodiment relates to a system including an internal combustion engine, a vibration sensor, and a controller. The vibration sensor is communicably coupled to the internal combustion engine and structured to acquire vibration data indicative of a vibration of the internal combustion engine. The controller is communicatively coupled with the vibration sensor and structured to: filter the vibration data within a predetermined engine combustion time period, determine a peak cylinder pressure (PCP) of a combustion cycle of the internal combustion engine based on the filtered vibration data, determine a location of peak cylinder pressure (LPP) of the combustion cycle of the internal combustion engine based on the filtered vibration data, the PCP and the LPP indicative of a performance characteristic of the combustion cycle, and modify an ignition timing of the internal combustion engine based on the determined PCP and LPP.

Still another embodiment relates to a method including filtering vibration data within a predetermined engine combustion time period. The vibration data is indicative of a vibration of an internal combustion engine. The method also includes determining a peak cylinder pressure (PCP) of a combustion cycle of the internal combustion engine based on the filtered vibration data, and determining a location of peak cylinder pressure (LPP) of the combustion cycle of the internal combustion engine based on the filtered vibration data. The PCP and the LPP are indicative of a performance characteristic of the combustion cycle. The method further includes modifying an ignition timing of the internal combustion engine based on the determined PCP and LPP.

These and other features, together with the organization and manner of operation thereof, will become apparent from the following detailed description when taken in conjunction with the accompanying drawings.

DETAILED DESCRIPTION

Figure 1:
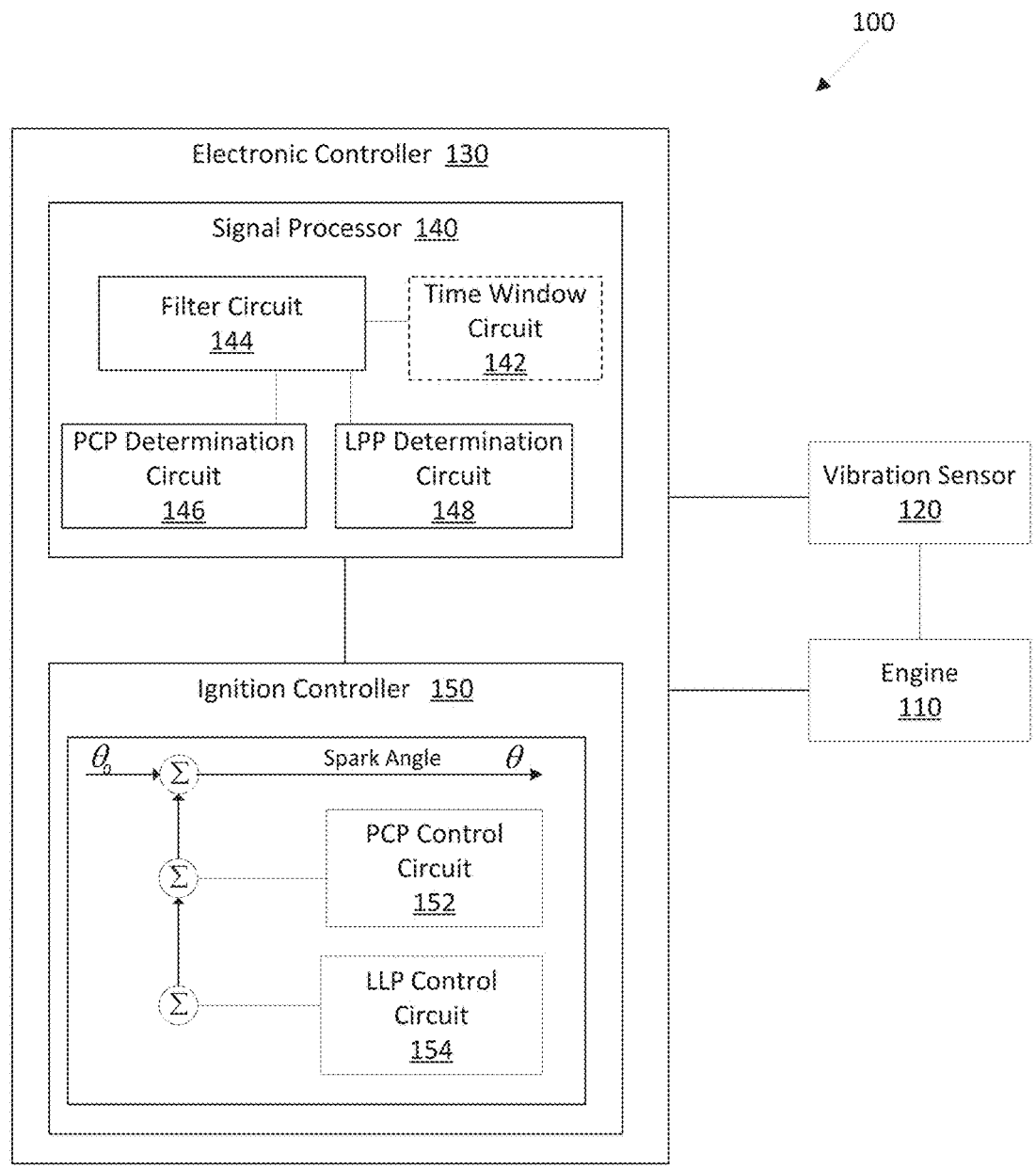
FIG. 1 is a schematic diagram of a system for diagnosis and control of an internal combustion engine, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various systems, methods, and apparatuses provided herein relate to diagnosis and control of an internal combustion engine using data obtained from a vibration sensor (e.g., an accelerometer) mounted on the engine. Combustion data indicative of combustion characteristics such as peak cylinder pressure (PCP) and location of peak cylinder pressure (LPP) may provide important information for diagnosing the working of the engine. As used herein, "peak cylinder pressure" or "PCP" refers to the maximum pressure in the engine cylinder during the engine operation. As used herein, "location of peak cylinder pressure" or "LPP" refers to the crank angle location corresponding to the peak cylinder pressure. Normal combustion has a range of LPP located slightly right of zero (0) degree crank angle (e.g., Top Dead Center position). When a misfire event occurs, for example, the LPP is located at the Top Dead Center position. In case of partial burning, for example, the pressure peak is significantly shifted to the right of the Top Dead Center position. By determining the LPP, the performance of the combustion can be diagnosed.

PCP and LPP may also be used as a basis for engine control. For example, PCP and LLP, either alone or in combination, may be used to control ignition timing (otherwise known as spark timing), ignition angle, or spark angle. As used herein, "ignition timing" refers to the crank angle location at which a spark occurs in the combustion chamber of the engine. Setting the correct ignition timing is crucial for the performance of the engine. The ignition timing may affect, for example, engine longevity, fuel economy, and engine power. Sparks occurring too early or too late in the engine cycle may cause excessive vibrations or even damage the engine. Comparing to the scheme of determining PCP and LPP through in-cylinder pressure sensors, embodiments disclosed herein may use a vibration sensor (e.g., an accelerometer) mounted on the engine to collect combustion data and extract combustion characteristics (e.g., PCP and LPP) from the combustion data. Because the accelerometer is located outside of the combustion chamber, no structural modifications of the engine is required. Moreover, the accelerometer does not need to withstand very high pressures and temperatures, therefore the vibration sensor may be of relatively low cost and have a longer durability than a sensor located within a combustion chamber.

Referring now to FIG. 1, a schematic diagram of a system 100 for diagnosis and control of an internal combustion engine is shown according to an example embodiment. The system 100 includes an internal combustion engine 110, a vibration sensor 120, and an electronic controller (EC) 130. The internal combustion engine 110 may be a single cylinder engine or a multiple cylinder engine. The vibration sensor 120 may be an accelerometer or any other type of sensor capable of measuring, detecting, or otherwise sensing vibrations of the engine 110 or components of the engine 110, such as a cylinder head or block. For example, in some embodiments, the vibration sensor 120 is a knock sensor. The vibration sensor 120 may be mounted on the engine 110 for monitoring vibrations and obtaining real-time information about in-cylinder pressure of the engine 110. In some embodiments, the vibration sensor 120 is mounted on the head of the engine 110. For example, the vibration sensor 120 may be mounted on a head bolt of a single cylinder engine. In some embodiments, the vibration sensor 120 may be mounted on a head bolt of a multiple cylinder engine. In multi-cylinder engines, a plurality of vibration sensors may be installed on the engine, and each vibration sensor may be installed on a respective cylinder of the engine. In some embodiments, one vibration sensor may be used for more than one cylinders of the engine. In some embodiments, more than one accelerometer may be installed on a single cylinder of the engine. The vibration sensor 120 may be commercially sold knock sensors for detecting engine knock, or any appropriate types of accelerometers.

The EC 130 may be connected to both the engine 110 and the vibration sensor 120. The EC 130 may include a signal processor 140 and an ignition controller 150. It should be understood that the EC 130 may include various other diagnosis and control systems not illustrated in the present figure. Communication between and among the components of the system 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus may include any number of wired and wireless connections. Although the signal processor 140 and the ignition controller 150 are shown as separate components in the figure, they may be combined in a single component. The EC 130 may be implemented as a general-purpose processor, an application specific integrated circuit (ASIC), one or more field programmable gate arrays (FPGAs), a digital signal processor (DSP), a group of processing components, or other suitable electronic processing components. The EC 130 may include one or more memory devices (e.g., RAM, ROM, Flash Memory, hard disk storage, etc.) that store data and/or instructions for facilitating the various processes described herein. The one or more memory devices may include database components, object code components, script components, or any other type of information structure for supporting the various activities and information structures described herein.

The signal processor 140 may receive vibration data from the vibration sensor 120. The signal processor 140 may include a filter circuit 144, a PCP determination circuit 146, and a LPP determination circuit 148. Optionally, the signal processor 140 may include a time window circuit 142. In some embodiments, the vibration signals include voltage signals. To accurately detect a pressure peak in a cylinder, a part of the vibration data corresponding to the combustion process in the cylinder may be considered. The time window circuit 142 may extract the vibration data that are within a time window that includes the combustion process in the engine 110. In some embodiments, the time window includes an instance in which the crank attains the Top Dead Center position, (i.e., 0 degree crank angle). For example, the time window includes a range of crank angle from −100 degree to 100 degree. The extraction may be implemented by masking the vibration data in a whole combustion cycle except within the time window. The crank angle may be monitored by a crank position sensor. In some embodiment, the time window circuit 142 may include a circuitry structured for extracting the accelerometer signals within the time window. In some embodiments, the time window circuit 142 may include instructions stored in machine-readable medium. In some embodiments, the time window circuit 142 may include any combination of machine-readable content and circuitry.

In order to extract information about the combustion process from the vibration data within the time window, the filter circuit 144 may filter the vibration data to a low-frequency range to produce filtered vibration data. The cut-off frequencies of the low-pass filter 144 depend in general on structural and combustion characteristics of the particular engine being used and thus may be different for different engines. The cut-off frequencies of the low-pass filter 144 may be experimentally determined in a setup phase, after having mounted the vibration sensor 120 on the engine 110. In some embodiments, the cut-off frequencies are about a few hundred Hz, for example, about 100 Hz to 800 Hz. In some embodiments, the cut-off frequencies are about 200 Hz to 700 Hz. In some embodiments, the cut-off frequencies are about 300 Hz to 500 Hz. In some embodiments, the filter circuit 144 is implemented as a hardware filter that comprises capacitors, resistors, and other circuitry to separate out low-frequency components of the vibration signals. In some embodiments, the filter circuit 144 is implemented as machine-readable instructions stored in machine-readable medium. For example, Fourier transform algorithm or zero-phase low-pass filter may be used to separate out the low-frequency components of the vibration signals. In some embodiments, the filter circuit 144 may include any combination of machine-readable content and circuitry.

The PCP determination circuit 146 may determine the peak cylinder pressure from the filtered vibration signals. In some embodiments, the vibration signals are voltage signals. The peak cylinder pressure may correspond to the maximum of the absolute voltage level, or the difference between the maximum and the minimum of the absolute voltage levels. For vibration signals on some engines (e.g., QSK60 SCE), the signals are flipped to detect the peak because the voltage at the peak is negative. For vibration signals on other engines (e.g., HH 16), the signals are not flipped because the voltage at the peak is positive. In some embodiment, the PCP determination circuit 146 includes a circuitry structured for determining the peak cylinder pressure. In some embodiments, the PCP determination circuit 146 includes instruction stored in machine-readable medium. In some embodiments, the PCP determination circuit 146 may include any combination of machine-readable content and circuitry. The LPP determination circuit 148 determines the location of peak cylinder pressure (i.e., the crank angle location corresponding to the peak cylinder pressure). The crank angle location may be monitored by a crank position sensor or a camshaft position sensor and be correlated with the accelerometer signals. It should be understood that the signal processor 140 may include any number of circuits for completing the functions described herein. For example, the activities of multiple modules may be combined as a single module, as additional modules with additional functionality may be included, etc.

The combustion characteristics (e.g., PCP and LPP) determined by the signal processor 140 may be used for real-time controlling the ignition timing of the engine 110 so as to prevent or correct combustion anomalies (e.g., misfire or partial burning). The combustion characteristics (e.g., PCP and LPP) determined by the signal processor 140 may also be used for controlling the ignition timing of the engine 110 so as to control the combustion to a targeted LPP or PCP. Therefore, the engine may run with less emission or better fuel efficiency. The ignition controller 150 may include a PCP control circuit 152 and a LPP control circuit 154. The ignition controller 150 sets a base ignition timing (i.e., spark angle) of $\theta_0$. In some embodiments, the base spark angle is in a range of 10 degree to 30 degree. For example, in some embodiments, the base spark angle is 20 degrees. The PCP control circuit 152 determines a first ignition timing offset based on the PCP determined by the PCP determination circuit 146. For example, in some embodiments, if the PCP is greater than a predetermined value, the ignition timing may be retarded by the controller because the greater PCP means that the current ignition timing is too advanced. In some embodiments, if the PCP is less than a predetermined value, the ignition timing may be advanced by the controller because the less PCP means that the current ignition timing is too retarded. The LPP control circuit 154 determines a second ignition timing offset based on the LPP determined by the LPP determination circuit 148. For example, in some embodiments, if the LPP is more advanced than a predetermined value, the ignition timing may be retarded by the controller. If the LPP is more retarded than a predetermined value, the ignition timing may be advanced by the controller. It should be understood that the signal processor 140 may include any number of modules for completing the functions described herein. For example, the activities of multiple modules may be combined as a single module, as additional modules with additional functionality may be included, etc.

Figure 2:
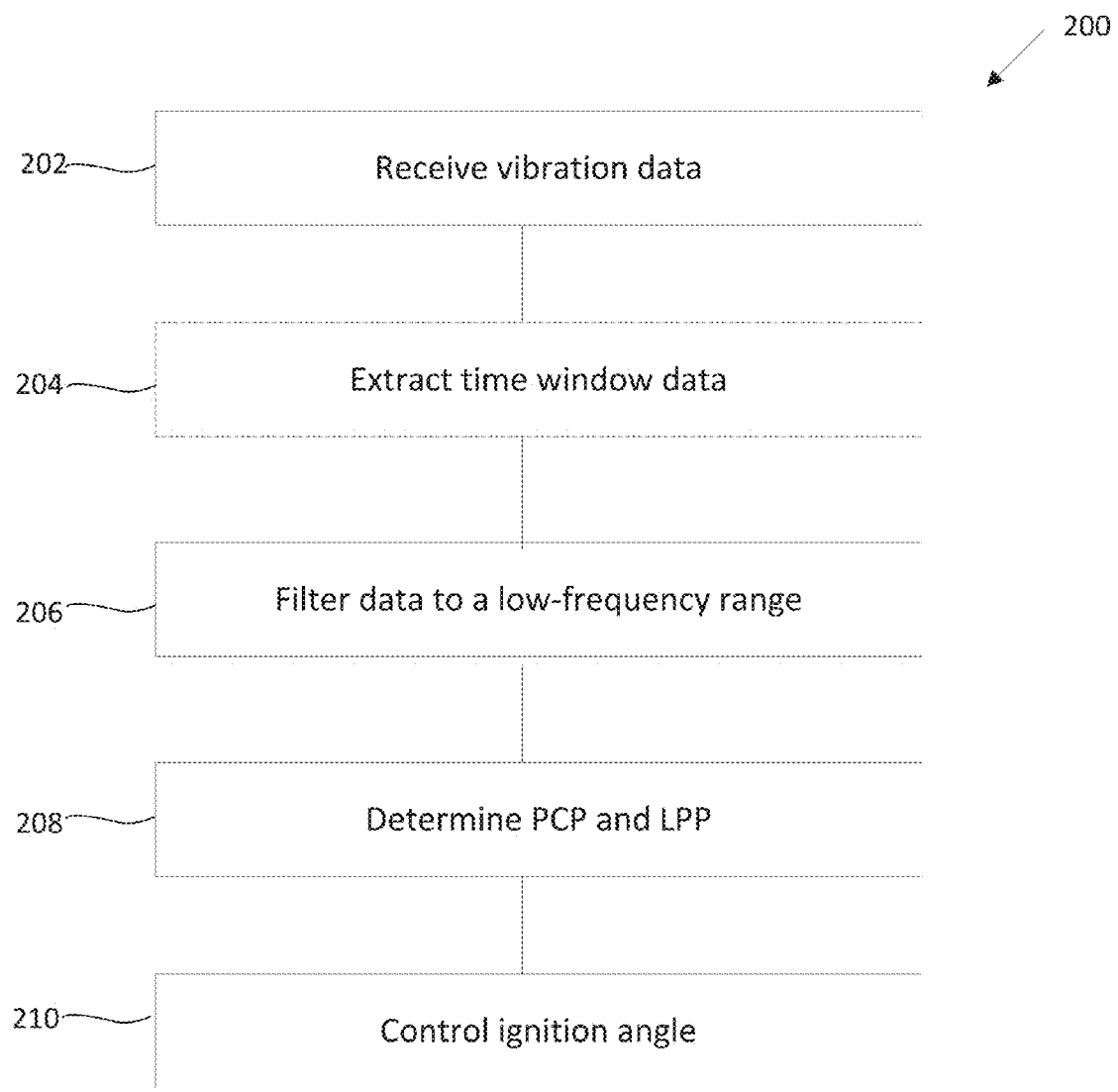
FIG. 2 is a flowchart of a method for diagnosis and control of an internal combustion engine, according to an example embodiment.

Referring now to FIG. 2, a flowchart of a method 200 for diagnosis and control of an operation parameter of an internal combustion engine is shown according to an example embodiment. In certain embodiments, method 200 is implemented with the EC 130 described herein. For example, method 200 may be embodied as machine-readable instructions that are executable by the signal processor 140 and the ignition controller 150. At operation 202, vibration data is received. The vibration data may be received from a vibration sensor mounted on a single cylinder engine, or vibration sensors mounted on multiple cylinder engine. The vibration sensor(s) may be commercially sold knock sensors for detecting engine knock, or an accelerometer structured to sense engine vibrations.

At operation 204, time window data is extracted from the received accelerometer data by, for example, the time window circuit 142 of FIG. 1. The time window circuit 142 may be structured to extract the accelerometer data that are within a time window that includes the combustion process in the engine 110. In some embodiments, the time window includes an instance in which the crank attains the Top Dead Center position, (i.e., 0 degree crank angle). In an embodiment, the time window includes a range of crank angle from −100 degree to 100 degree. The extraction may be implemented by masking the accelerometer data in a whole combustion cycle except within the time window. The crank angle may be monitored by a crank position sensor.

At operation 206, the time window data or the vibration data is filtered by, for example, the filter circuit 144 of FIG. 1 to a low-frequency range to produce filtered signals. The cut-off frequencies of the low-pass filter 144 depend in general on structural and combustion characteristics of the particular engine being used and thus they may be different for different engines. The cut-off frequencies of the low-pass filter 144 may be experimentally determined in a setup phase, after having mounted the accelerometer 120 on the engine 110. In some embodiments, the cut-off frequencies are about a few hundred Hz, for example, about 100 Hz to 800 KHz. In some embodiments, the cut-off frequencies are about 200 Hz to 700 Hz. In some embodiments, the cut-off frequencies are about 300 Hz to 500 Hz.

At operation 208, the PCP and LPP are determined from the filtered data by, for example, the PCP determination circuit 146 and the LPP determination circuit 148 of FIG. 1. In some embodiments, the accelerometer data are voltage signals. In some embodiments, the PCP corresponds to the maximum of the absolute voltage level, or the difference between the maximum and the minimum of the absolute voltage levels. For accelerometer signals on some engines (e.g., QSK60 SCE), the signals are flipped to detect the peak because the voltage at the peak is negative. For accelerometer signals on other engines (e.g., HH 16), the signals are not flipped because the voltage at the peak is positive. The LPP determination circuit 148 determines the LPP (i.e., the crank angle location corresponding to the PCP). The crank angle location may be monitored by a crank position sensor or a crank angular velocity sensor and be correlated with the accelerometer signals.

At operation 210, an ignition timing (or, ignition angle) is controlled based on the determined LPP and PCP by, for example, the ignition controller 150 of FIG. 1. In some embodiments, the ignition controller 150 includes the PCP control circuit 152 and the LPP control circuit 154. The ignition controller 150 sets a base ignition timing (i.e., spark angle) of $\theta_0$. In some embodiments, the base spark angle is in a range of 10 degree to 30 degree (e.g., 20 degree). The PCP control circuit 152 determines a first ignition timing offset based on the PCP determined by the PCP determination circuit 146. For example, if the PCP is greater than a predetermined value, the ignition timing should be retarded. If the PCP is less than a predetermined value, the ignition timing should be advanced. The LPP control circuit 154 determines a second ignition timing offset based on the LPP determined by the LPP determination circuit 148. For example, if the LPP is more advanced than a predetermined value, the ignition timing should be retarded. If the LPP is more retarded than a predetermined value, the ignition timing should be advanced.

It should be understood that the schematic flow chart diagram described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Figure 3:
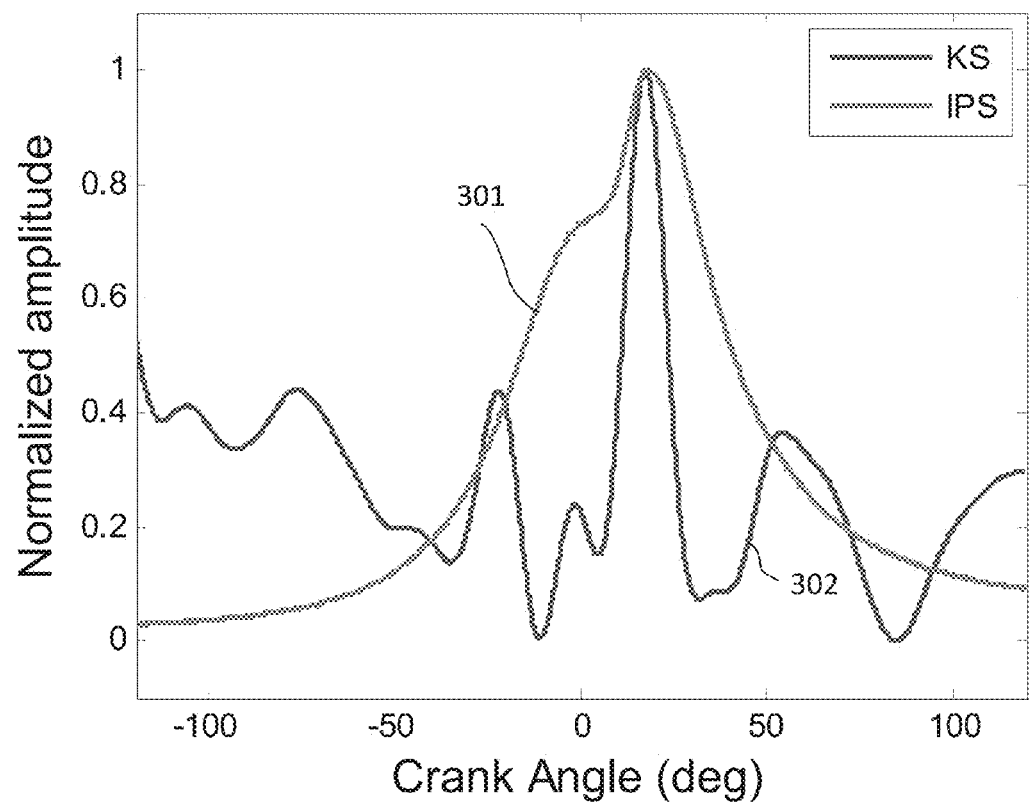
FIG. 3 is a graph showing the correlation between vibration data processed using the method of FIG. 2 and in-cylinder pressure sensor signals for a same engine.

Referring to FIG. 3, a graph shows the correlation between vibration data processed using the method of FIG. 2 and in-cylinder pressure sensor data for a same engine. For test purposes, an accelerometer has been mounted on an engine also having an in-cylinder pressure sensor. The signals generated by the pressure sensor and by the accelerometer were compared for various crank angles as shown in FIG. 3. The graph confirms the existence of a significant correlation between the two signals.

Figure 4:
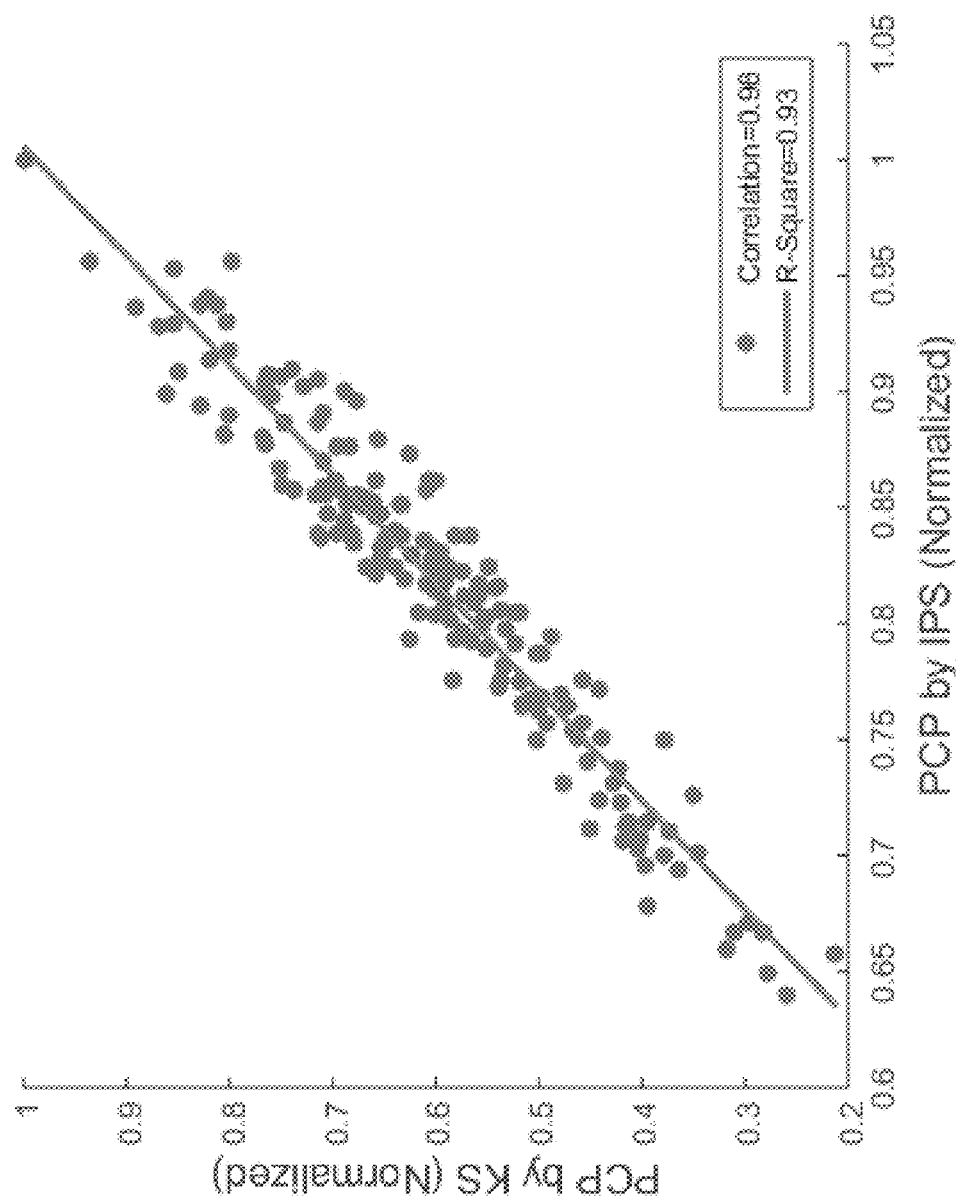
FIG. 4 is a graph showing the correlation between the peak cylinder pressure (PCP) of combustion determined from the vibration data using the method of FIG. 2 and the PCP determined from the data collected by the in-cylinder pressure sensor for a single cylinder engine.

Referring to FIG. 4, a graph shows the correlation between the PCPs determined from the vibration data using the method of FIG. 2 and the PCPs determined from the data collected by the in-cylinder pressure sensor for a single cylinder engine. The graph shows a good match between the two sets of PCPs.

Figure 5:
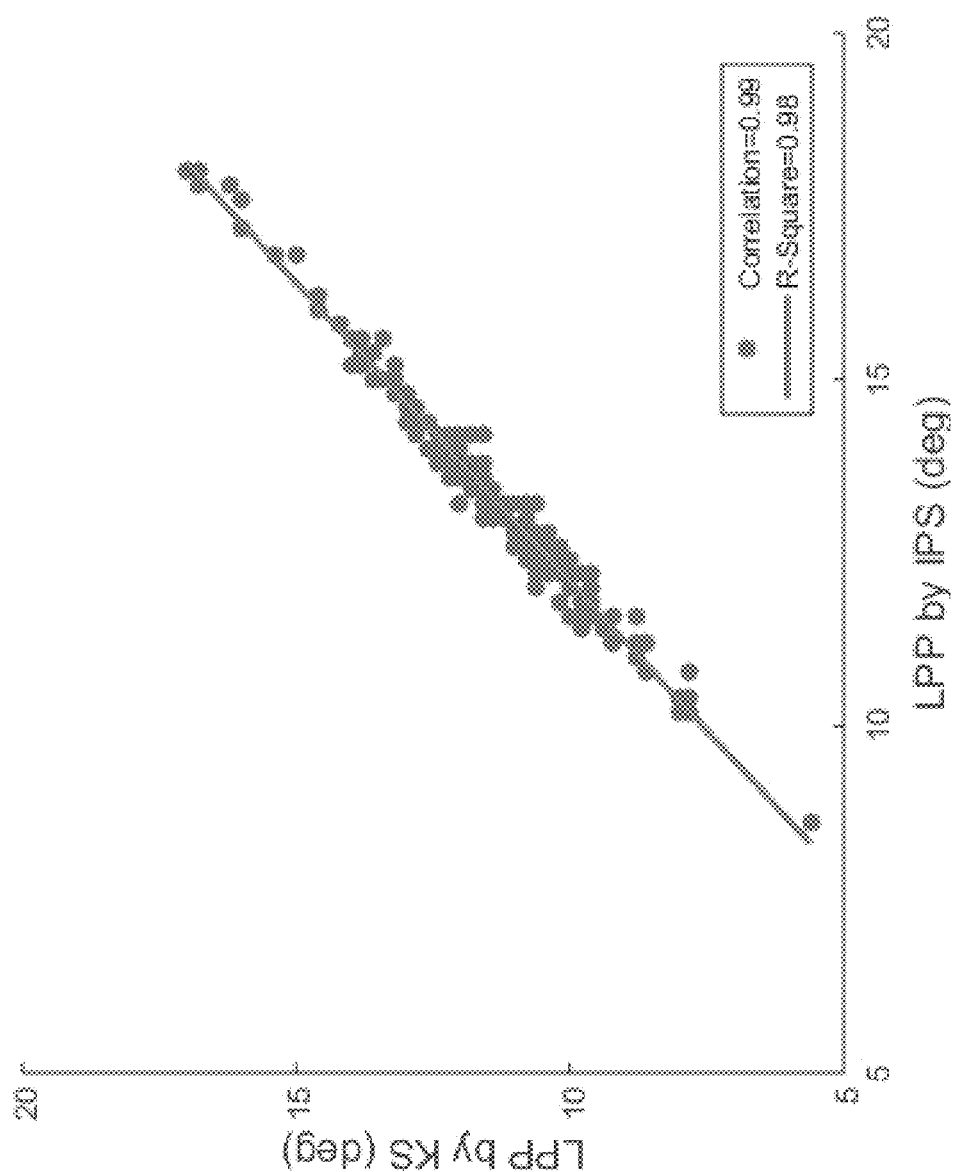
FIG. 5 is a graph showing the correlation between the location of peak cylinder pressure (LPP) of combustion determined from the vibration data using the method of FIG. 2 and the LPP determined from the data collected by the in-cylinder pressure sensor for a single cylinder engine.

Referring to FIG. 5, a graph shows the correlation between the LPPs determined from the vibration data using the method of FIG. 2 and the LPPs determined from the data collected by the in-cylinder pressure sensor for a single cylinder engine. The graph shows a good match between the two sets of LPPs.

Figure 6:
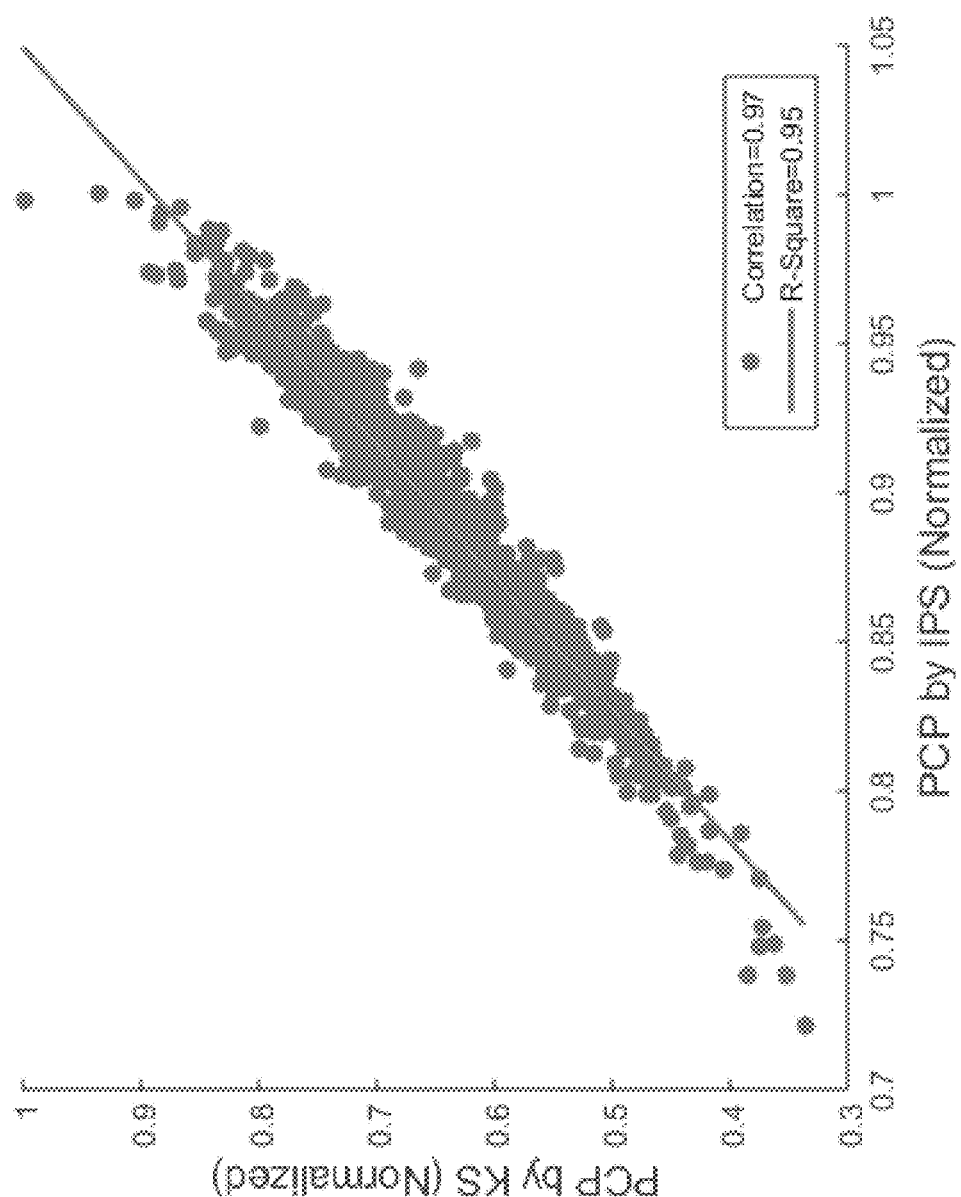
FIG. 6 is a graph showing the correlation between the PCP of combustion determined from the vibration data using the method of FIG. 2 and the PCP determined from the data collected by the in-cylinder pressure sensor for a multiple cylinder engine.

Referring to FIG. 6, a graph shows the correlation between the PCPs determined from the vibration data using the method of FIG. 2 and the PCPs determined from the data collected by the in-cylinder pressure sensor for a multiple cylinder engine. The graph shows a good match between the two sets of PCPs.

Figure 7:
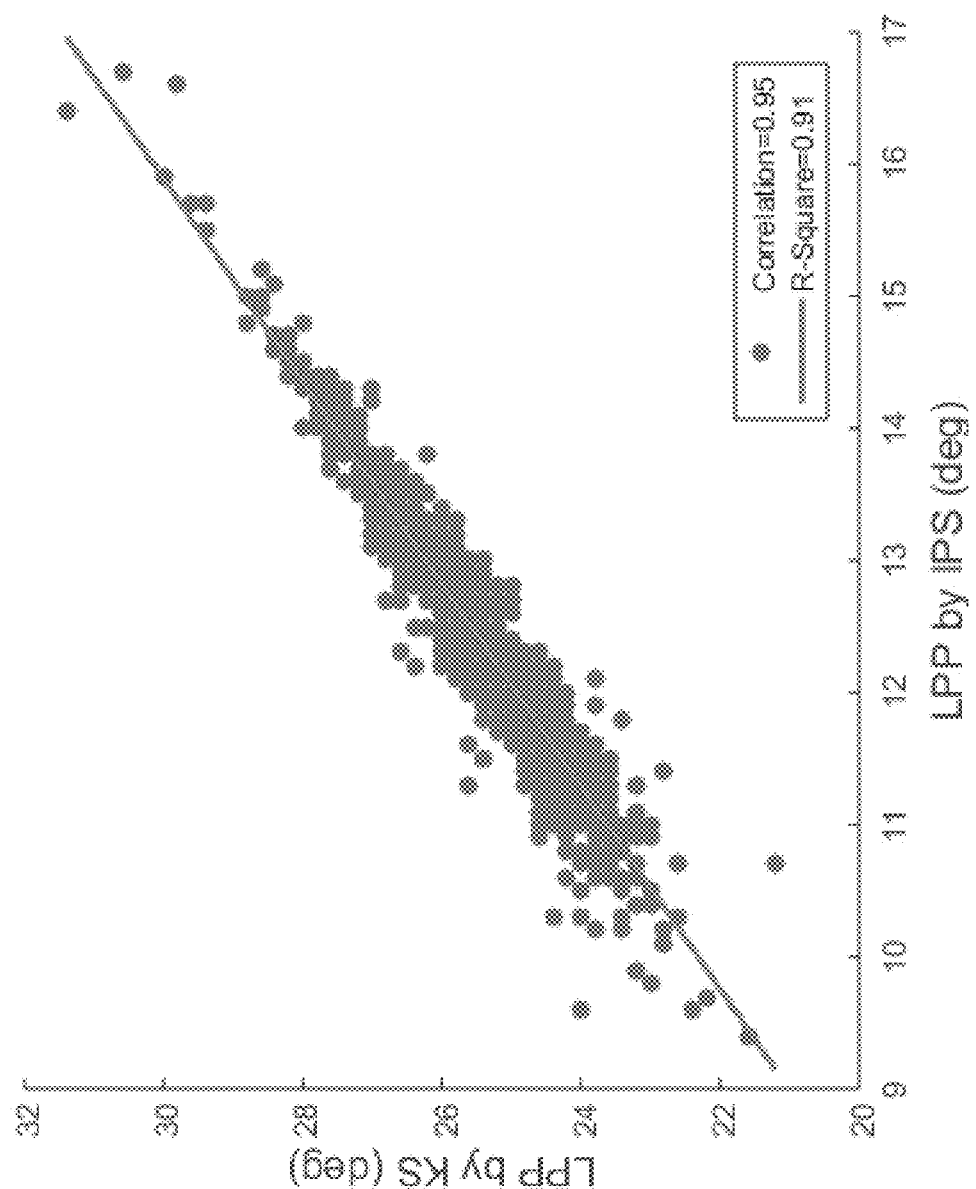
FIG. 7 is a graph showing the correlation between the LPP of combustion determined from the vibration data using the method of FIG. 2 and the LPP determined from the data collected by the in-cylinder pressure sensor for a multiple cylinder engine.
Figure 8A:
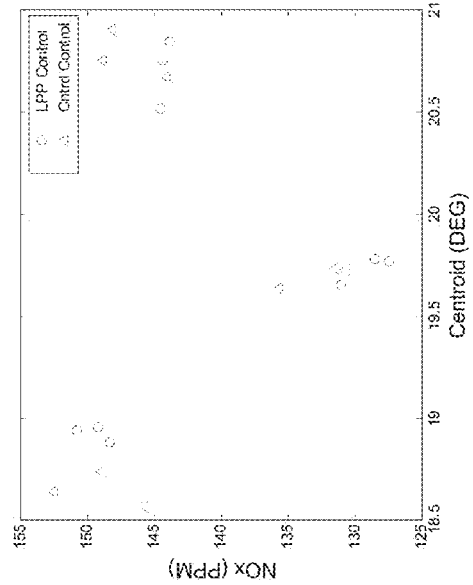
FIGS. 8(a)-8(d) are graphs showing results of engine control based on data obtained from an vibration sensor using method of FIG. 2 and results of engine control based on in-cylinder pressure sensor signals.
Figure 8B:
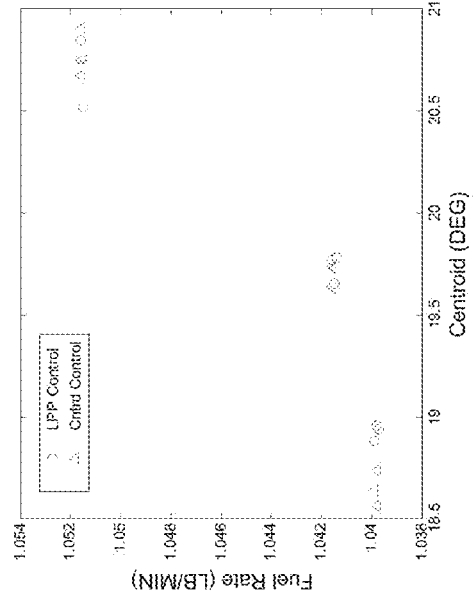
Figure 8C:
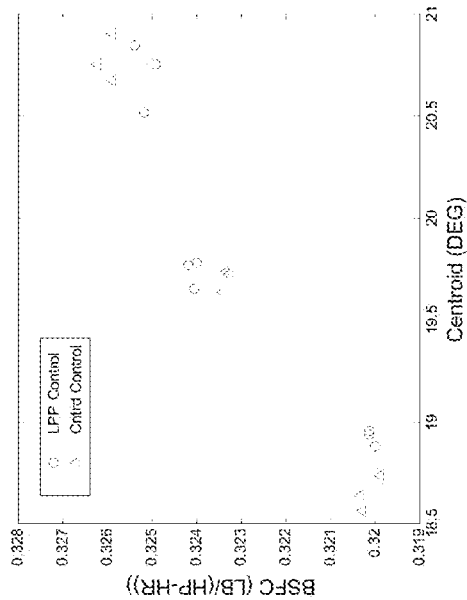
Figure 8D:
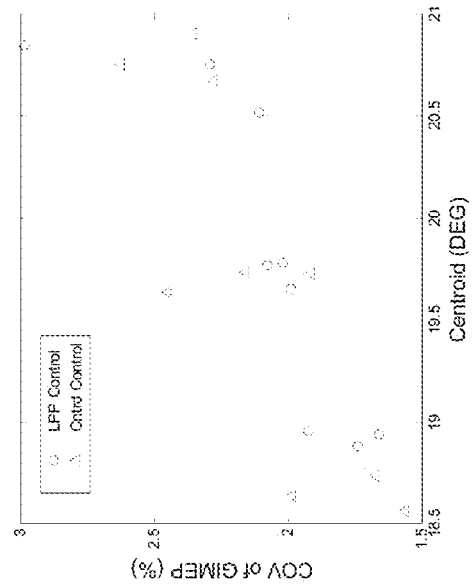

Referring to FIG. 7, a graph shows the correlation between the LPP determined from the vibration data using the method of FIG. 2 and the LPP determined from the data collected by the in-cylinder pressure sensor for a multiple cylinder engine. The graph shows a good match between the two sets of LPPs.

Referring to FIG. 8, FIGS. 8(*a*) through 8(*d*) show results of engine control based on data obtained from a vibration sensor using method of FIG. 2 and results of engine control based on in-cylinder pressure sensor signals. Specifically, FIG. 8(*a*) shows the results of brake specific fuel consumption (BSFC), which is a measure of the fuel efficiency of an engine. FIG. 8(*b*) shows the results of $NO_x$ emission. FIG. 8(*c*) shows the results of coefficient of variation (COV) of gross indicated mean effective pressure (GIMEP), which is the average pressure acting on a piston during a power stroke of its cycle. FIG. 8(*d*) shows the results of fuel rate, which is also a measure of the fuel efficiency of an engine. As shown by FIG. 8, similar results of engine control were achieved based on signals from an accelerometer using method of FIG. 2 and based on in-cylinder pressure sensor signals.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting circuit implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state structured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

No claim element herein is to be construed under the provisions of 35 U.S.C. § 112, sixth paragraph, unless the element is expressly recited using the phrase "means for."

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:
1. An apparatus, comprising:
 a filter circuit structured to filter vibration data within a predetermined engine combustion time period, the vibration data indicative of a vibration of an internal combustion engine, the vibration data including voltage signals;

a PCP determination circuit operatively and communicably coupled to the filter circuit and structured to determine a peak cylinder pressure (PCP) of a combustion cycle of the internal combustion engine based on the filtered vibration data, the PCP corresponding to a maximum of absolute levels of the voltage signals or a difference between the maximum and a minimum of the absolute levels of the voltage signals;

a LPP determination circuit operatively and communicably coupled to the filter circuit and structured to determine a location of peak cylinder pressure (LPP) of the combustion cycle of the internal combustion engine based on the filtered vibration data, the PCP and the LPP indicative of a performance characteristic of the combustion cycle; and an ignition timing circuit operatively and communicably coupled to the PCP determination circuit and the LPP determination circuit, wherein the ignition timing circuit is structured to modify an ignition timing of the internal combustion engine based on the determined PCP and LPP.

2. The apparatus of claim 1, wherein the ignition timing circuit is structured to modify the ignition timing of the internal combustion engine to prevent the internal combustion engine from partial fire, misfire, or over pressure.

3. The apparatus of claim 1, wherein the predetermined engine combustion time period includes a range of crank angle from about −100 degree to about 100 degree.

4. The apparatus of claim 1, wherein the filter circuit includes a low-pass filter, and wherein a cutoff frequency of the low-pass filter is in a range of about 100 Hz to about 800 Hz.

5. The apparatus of claim 1, wherein the LPP corresponds to a crank angle location corresponding to a peak of the filtered vibration data.

6. The apparatus of claim 1, further comprising:
a PCP control circuit operatively and communicably coupled to the PCP determination circuit and structured to determine a first ignition timing offset to a base ignition timing based on the PCP determined by the PCP determination circuit.

7. The apparatus of claim 1, further comprising:
a LPP control circuit operatively and communicably coupled to the LPP determination circuit and structured to determine a second ignition timing offset to the base ignition timing based on the LPP determined by the LPP determination circuit.

8. A system, comprising:
a vibration sensor communicably coupled to the internal combustion engine and structured to acquire vibration data indicative of a vibration of an internal combustion engine, the vibration data including voltage signals; and
a controller communicatively coupled with the vibration sensor, the controller structured to:
filter the vibration data within a predetermined engine combustion time period;
determine a peak cylinder pressure (PCP) of a combustion cycle of the internal combustion engine based on the filtered vibration data, the PCP corresponding to a maximum of absolute levels of the voltage signals or a difference between the maximum and a minimum of the absolute levels of the voltage signals;
determine a location of peak cylinder pressure (LPP) of the combustion cycle of the internal combustion engine based on the filtered vibration data, the PCP and the LPP indicative of a performance characteristic of the combustion cycle; and
modify an ignition timing of the internal combustion engine based on the determined PCP and LPP.

9. The system of claim 8, wherein the vibration sensor is an accelerometer mounted on the internal combustion engine.

10. The system of claim 9, wherein the accelerometer includes a knock sensor.

11. The system of claim 9, wherein the accelerometer is mounted on a cylinder head or a head bolt of the internal combustion engine.

12. The system of claim 8, wherein the vibration data is filtered using a low-pass filter.

13. The system of claim 12, wherein a cutoff frequency of the low-pass filter is in a range of about 100 Hz to about 800 Hz.

14. The system of claim 8, wherein the internal combustion engine is a single-cylinder engine or a multiple-cylinder engine.

15. The system of claim 8, wherein the predetermined engine combustion time period includes a range of crank angle from about −100 degree to about 100 degree.

16. The system of claim 8, wherein the LPP corresponds to a crank angle location corresponding to a peak of the filtered vibration data.

17. The system of claim 8, wherein the controller is further configured to:
determine a first ignition timing offset to a base ignition timing based on the determined PCP; and
modify the base ignition timing with the first ignition timing offset.

18. The system of claim 8, wherein the controller is further configured to:
determine a second ignition timing offset to the base ignition timing based on the determined LPP; and
modify the base ignition timing with the second ignition timing offset.

19. A method, comprising:
filtering vibration data within a predetermined engine combustion time period, the vibration data indicative of a vibration of an internal combustion engine, the vibration data including voltage signals;
determining a peak cylinder pressure (PCP) of a combustion cycle of the internal combustion engine based on the filtered vibration data, the PCP corresponding to a maximum of absolute levels of the voltage signals or a difference between the maximum and a minimum of the absolute levels of the voltage signals;
determining a location of peak cylinder pressure (LPP) of the combustion cycle of the internal combustion engine based on the filtered vibration data, the PCP and the LPP indicative of a performance characteristic of the combustion cycle; and
modifying an ignition timing of the internal combustion engine based on the determined PCP and LPP.

20. The method of claim 19, wherein the predetermined engine combustion time period includes a range of crank angle from about −100 degree to about 100 degree.

21. The method of claim 19, wherein the filtering vibration data includes filtering the vibration data using a low-pass filter, and wherein a cutoff frequency of the low-pass filter is in a range of about 100 Hz to about 800 KHz.

22. The method of claim 19, wherein the LPP corresponds to a crank angle location corresponding to a peak of the filtered vibration data.

23. The method of claim 19, further comprising:
    determining a first ignition timing offset to a base ignition timing based on the determined PCP; and
    modifying the base ignition timing with the first ignition timing offset.

24. The method of claim 19, further comprising:
    determining a second ignition timing offset to the base ignition timing based on the determined LPP; and
    modifying the base ignition timing with the second ignition timing offset.

* * * * *